United States Patent
Baer et al.

(10) Patent No.: US 8,123,257 B1
(45) Date of Patent: Feb. 28, 2012

(54) CRIMP SLEEVE FOR FLEXIBLE TUBING

(75) Inventors: Rex L. Baer, Harrisonville, MO (US); Frank D. Julian, Kansas City, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 80 days.

(21) Appl. No.: 12/833,565

(22) Filed: Jul. 9, 2010

Related U.S. Application Data

(63) Continuation-in-part of application No. 12/423,364, filed on Apr. 14, 2009, now abandoned.

(51) Int. Cl.
*F16L 33/00* (2006.01)

(52) U.S. Cl. .......................... 285/256; 285/243; 285/23

(58) Field of Classification Search .............. 285/256, 285/322, 243, 23, 257
See application file for complete search history.

(56) References Cited

U.S. PATENT DOCUMENTS

| | | | |
|---|---|---|---|
| 1,006,671 A | 10/1911 | Myer | |
| 2,570,421 A | 9/1951 | Baldwin, Jr. et al. | |
| 4,408,786 A | 10/1983 | Stuemky | |
| 5,551,735 A | 9/1996 | Takayanagi et al. | |
| 5,722,150 A | 3/1998 | Swanson, III | |
| 5,797,629 A | 8/1998 | Beagle | |
| 6,523,862 B1 | 2/2003 | MacDuff | |
| 6,796,586 B2 | 9/2004 | Werth | |
| 7,090,257 B2 | 8/2006 | Werth | |
| 7,134,696 B2 | 11/2006 | Poll | |
| 7,360,800 B2 | 4/2008 | Poll et al. | |
| 7,364,206 B2 | 4/2008 | Romanelli et al. | |
| 2006/0082156 A1 | 4/2006 | Runyan | |
| 2008/0012303 A1 | 1/2008 | Poll et al. | |

FOREIGN PATENT DOCUMENTS

| | | |
|---|---|---|
| EP | 0807781 | 11/1997 |
| EP | 1174653 | 1/2002 |
| EP | 1378700 | 1/2004 |

OTHER PUBLICATIONS

Product Specification Sheet showing the Viega PureFlow Stainless Steel Press Sleeve, believed to have been on sale for more than one year prior to the filed of the present application.

*Primary Examiner* — David E Bochna
(74) *Attorney, Agent, or Firm* — Erickson, Kernell, Derusseau & Kleypas, LLC

(57) ABSTRACT

A crimp sleeve includes a cylindrical side wall having a plurality of slots cut therein to form a plurality of fingers. Each finger includes a shank and an inwardly extending tab. The shanks of the fingers are formed at an inward angle relative to the sleeve wall. The tips of the tabs define a tip diameter which forms an interference fit with the nipple on which the sleeve is to be installed. The interference fit between the tabs and the nipple allows the sleeve to be preloaded on the nipple. When the end of a length of tubing is inserted in the sleeve, the tubing will contact the shanks of the fingers and urge the fingers outwardly, increasing the tip diameter.

21 Claims, 5 Drawing Sheets

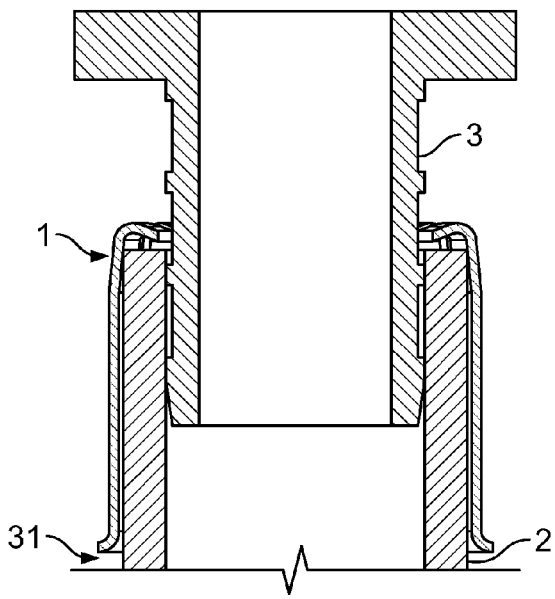
FIG. 6
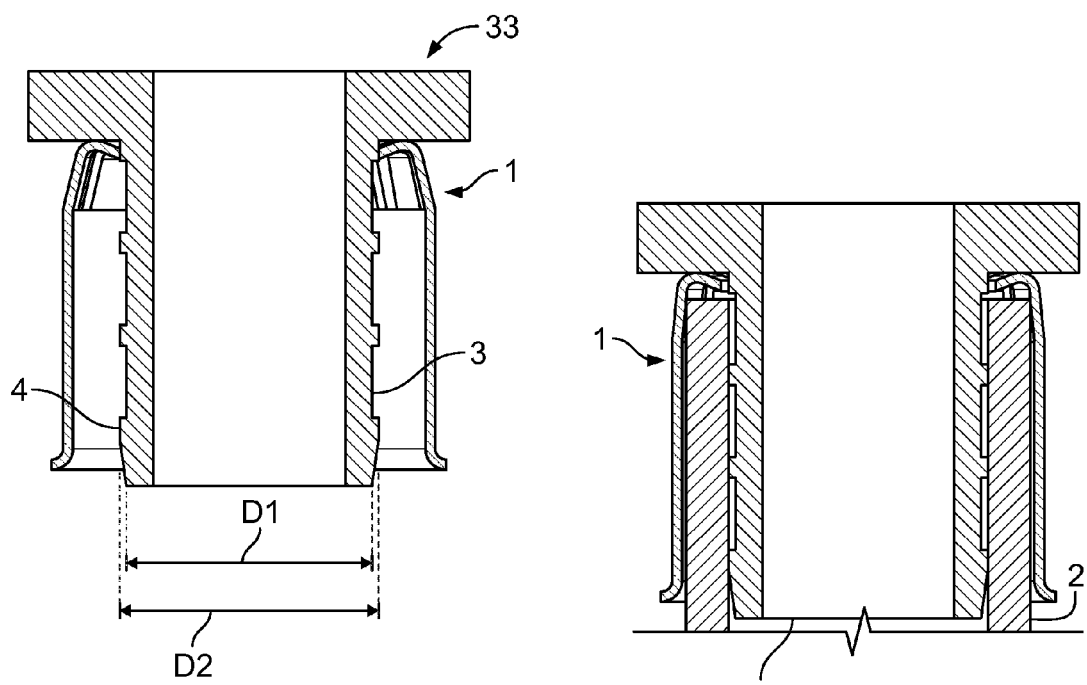
FIG. 7
FIG. 8

CRIMP SLEEVE FOR FLEXIBLE TUBING

This application is a continuation-in-part of application Ser. No. 12/423,364 filed Apr. 14, 2009.

BACKGROUND OF THE INVENTION

1. Field of the Invention

This invention relates to crimp sleeves or crimp rings for crimping around a piece of flexible tubing to secure the tubing to a nipple of a fitting or the like in order to provide a leak-free connection.

2. Description of the Related Art

Flexible tubing, such as PEX (cross-linked polyethylene) tubing is used in radiant heating systems and is being used in place of rigid pipe in residential plumbing systems with increasing frequency. This type of tubing is easier to install than conventional rigid pipe since it can be routed around obstacles without adding elbows and the like to accomplish the bend. When flexible tubing needs to be fastened to a fitting, fixture, valve, or the like, the tubing is pushed onto a nipple of the fitting such that the nipple is received inside of the tubing. A crimp ring is then placed around the tubing in the area over the nipple and crimped in place using a crimping tool to complete the connection.

Crimp rings are typically simple sleeves of brass, copper or the like which are slid over the tubing and crimped in place. A newer device for fastening PEX tubing to a nipple is the Viega PureFlow® Stainless Steel Press Sleeve, which comprises a stainless steel sleeve having a first end which is open for insertion of the tubing and a second end having an inwardly projecting annular flange which provides a stop for the tubing. Use of this product assists in locating the crimp at the correct position relative to the end of the tubing, since the addition of the stop more or less fixes the location of the sleeve on the tubing. A single view hole is provided through the sleeve near the annular flange so that an installer can see whether the tubing is inserted a sufficient distance into the sleeve.

A problem with any of the prior art crimp sleeves is that they must be manually positioned on the tubing before the tubing is pushed onto the nipple. If the installer forgets and installs the tubing on the nipple before placing the sleeve on the tube, the tubing will usually need to be removed from the nipple and the sleeve installed. Nipples used in these applications typically include barbs for retaining the tubing so that pulling the tubing off of the nipple may be difficult and might require cutting of the tubing. There is significant risk of damaging the fitting or fixture. Crimp sleeves are also frequently lost.

What is needed is a crimp sleeve which can be pre-installed or pre-loaded onto the nipple so that it is always in position for attachment of the tubing. The sleeve would preferably be securely attached to the nipple so that it wouldn't be easily dislodged.

Furthermore, a crimp sleeve which could alternatively be securely pre-installed on the end of a length of tubing would also be advantageous. Such a crimp sleeve could be installed on the tubing before the tubing is pressed onto the nipple and would not fall off during the installation process.

SUMMARY OF THE INVENTION

The present invention includes a crimp sleeve having a plurality of fingers extending generally longitudinally outward from one end of a cylindrical sleeve. The fingers are separated by circumferentially spaced longitudinal slots. Each finger includes a shank and an inwardly extending tab. The shanks of the fingers are formed at an inward angle relative to the sleeve wall. The tips of the tabs define a tip diameter which forms an interference fit with the nipple on which the sleeve is to be installed. The interference fit between the tabs and the nipple allows the sleeve to be pre-loaded on the nipple. The tubing can then be inserted onto the nipple and under the sleeve.

The sleeve can also be installed by first inserting the tubing into the sleeve and then installing the tubing and sleeve onto the nipple. When the end of a length of tubing is inserted in the sleeve, the tubing will contact the shanks of the fingers and urge the fingers outwardly, thereby increasing the tip diameter. This allows the sleeve to be installed onto the nipple without the tips dragging across the nipple and causing damage to the nipple. The fingers also exert pressure against the tubing and thereby secure the sleeve to the tubing so that it will not fall off prior to installation of the tubing onto the nipple.

BRIEF DESCRIPTION OF THE DRAWINGS

FIG. 6 is a partially exploded cross-sectional view showing the crimp sleeve installed on a length of flexible tubing prior to a nipple being inserted into the tubing.

FIG. 7 is a cross-sectional view showing the crimp sleeve installed on a nipple prior to the nipple being inserted into a length of tubing.

FIG. 8 is a cross-sectional view showing the crimp sleeve installed on a length of tubing over a nipple in a final orientation prior to crimping of the crimp sleeve.

DETAILED DESCRIPTION OF THE PREFERRED EMBODIMENTS

Figure 1:
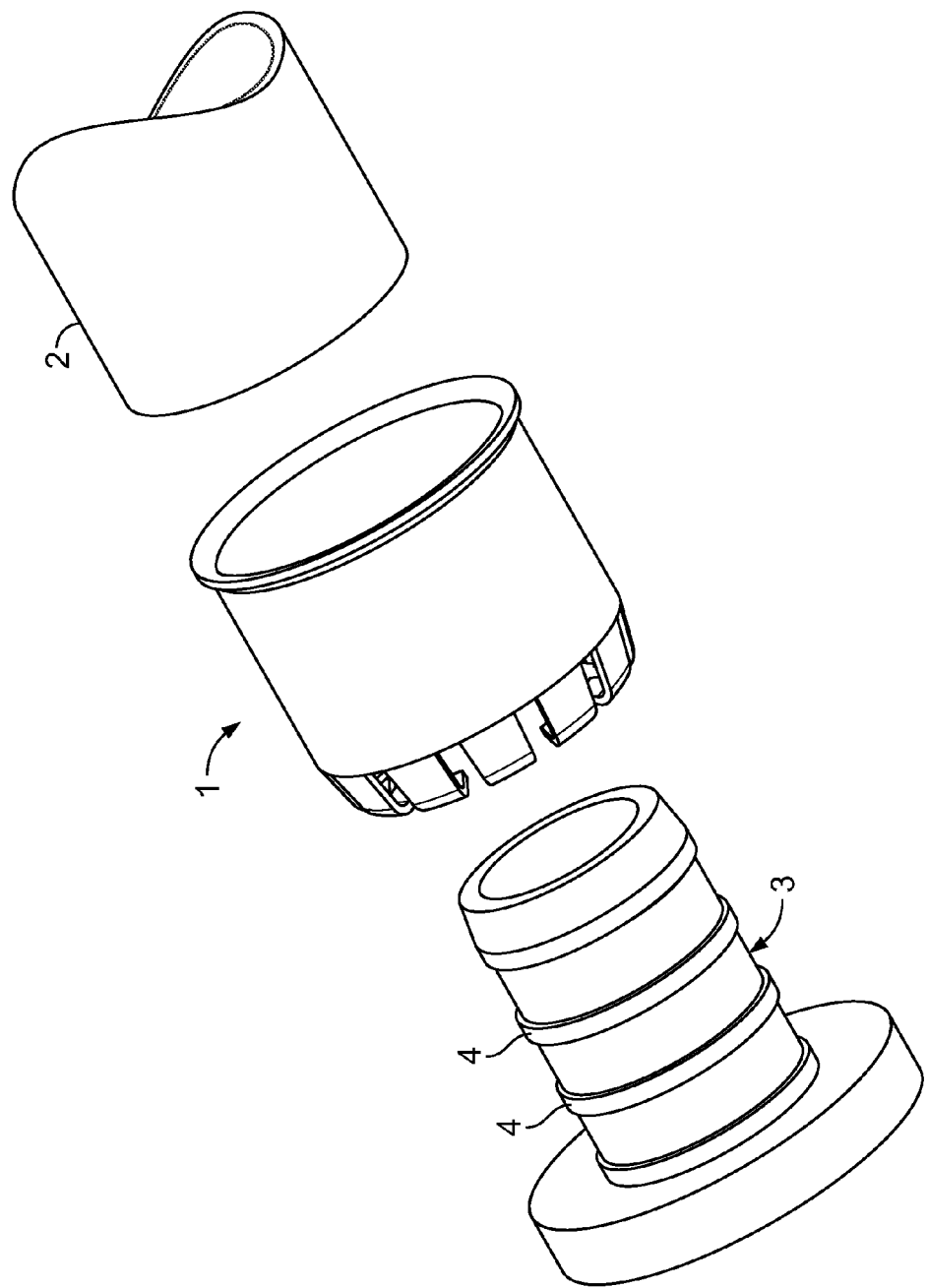
FIG. 1 is an exploded perspective view showing a crimp sleeve according to the present invention in position of installation between a nipple and a length of flexible tubing.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a crimp sleeve according to the present invention. The crimp sleeve 1 is used to fasten an end of a length of flexible tubing 2, such as PEX (cross-linked polyethylene) tubing, onto a nipple 3, which may be part of a fitting, valve, fixture, or the like (not shown). The nipple 3 is sized to be received within the tubing 2 and will typically include one or more annular barbs 4 which extend radially outwardly from the nipple 3 to engage the tubing 2. As shown in FIG. 7, the nipple 3 has a first or minimum nipple diameter D1 and a second or maximum diameter D2, which is defined by the barb or barbs 4. In a final position, as shown in FIG. 8, the crimp sleeve 1 is fitted around the outside of the tubing 2 in register with the nipple 3 and ready for crimping. The crimp sleeve 1 is then crimped inwardly with a crimping tool (not shown) to compress the tubing 2 against the nipple 3 and barbs 4.

Figure 2:
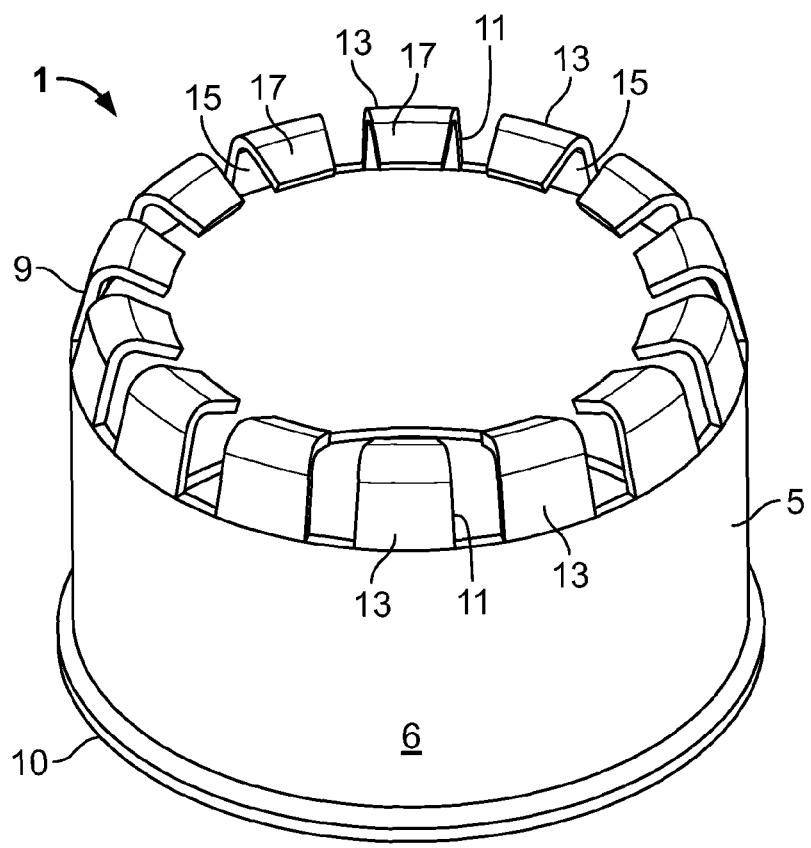
FIG. 2 is a perspective view of a crimp sleeve according to the present invention.
Figure 3:
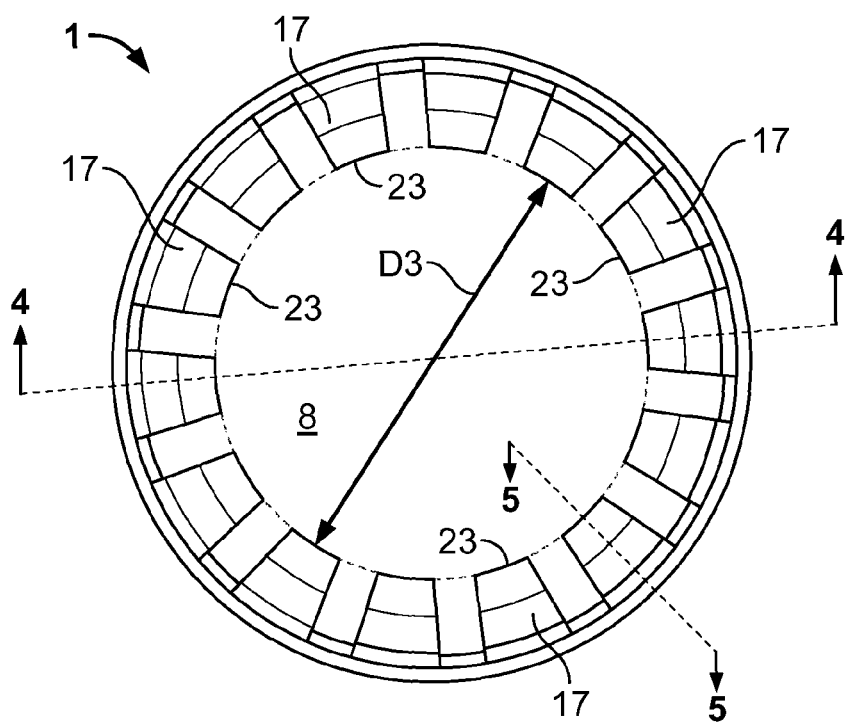
FIG. 3 is an end view of the crimp sleeve.
Figure 4:
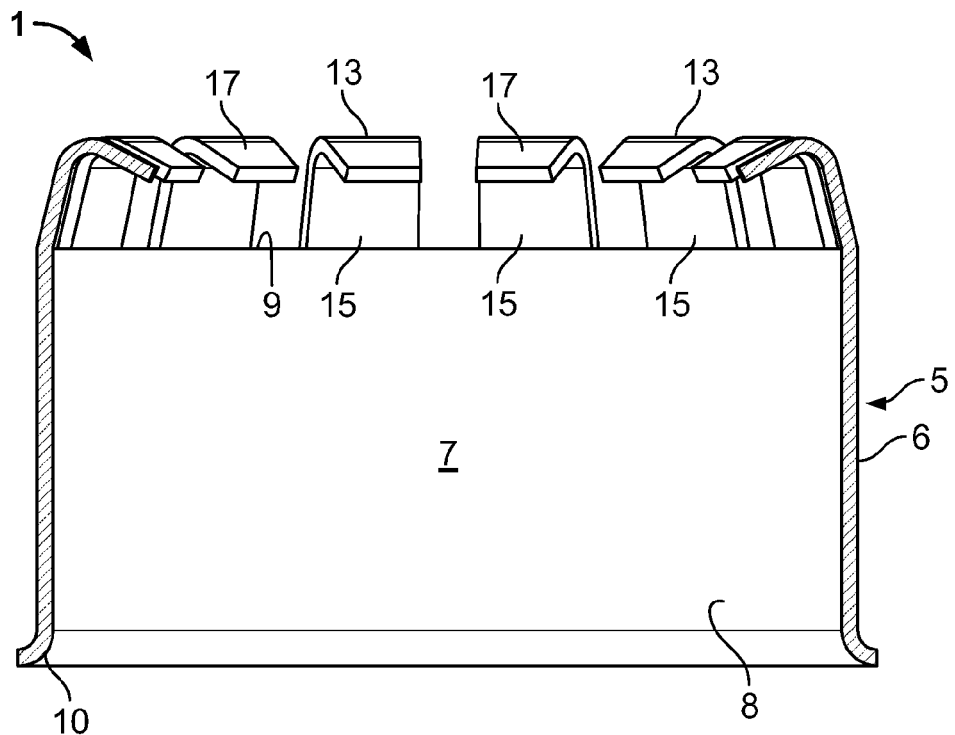
FIG. 4 is a cross-sectional view of the crimp sleeve taken generally along line 4-4 in FIG. 3.

Referring to FIGS. 2-4, the crimp sleeve 1 is formed of sheet metal and includes a generally cylindrical side wall 5 having an outer surface 6 and an inner surface 7 defining a central passageway 8. The passageway 8 has a diameter sized to receive the tubing 2 and to generally conform to the outside diameter of the tubing 2. The sleeve 1 has first and second ends 9 and 10, respectively. The first end 9 of the sleeve 1 has a plurality of fingers 13 which extend generally longitudinally outwardly therefrom and are angled slightly radially inward. The fingers 13 are circumferentially spaced apart around the perimeter of the side wall 5 by slots 11.

Figure 5:
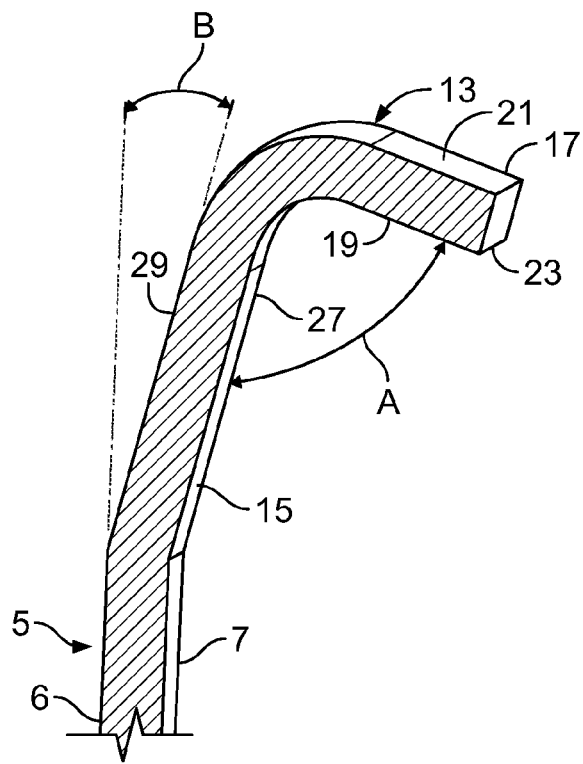
FIG. 5 is a cross-sectional view of a single finger of the crimp sleeve taken generally along line 5-5 in FIG. 3.

As best seen in FIG. 5, each finger 13 includes a shank 15 and a tab 17 which extends radially inward from the respective shank 15 into the passageway 8. Each tab 17 is oriented at an angle A relative to the respective shank 15. The angle A can be a right angle, but is preferably somewhat less than 90 degrees, for example 45 to 89 degrees. An angle A of less than 90 degrees allows the sleeve 1 to be more easily pushed onto the nipple 3 since the tabs 17 will move over the barbs 4 without excessive binding. The optimal angle A varies with the size of the sleeve 1, for example a sleeve 1 sized for ½ inch tubing 2 has a preferred angle A of 55.3 degrees, whereas a sleeve 1 sized for 1 inch tubing 2 has a preferred angle A of 85.3 degrees. In general, the larger the sleeve 1, the less the tabs 17 need to be angled inwardly relative to the shanks 15.

Each tab 17 is generally trapezoidal in shape and includes an inner face 19, an outer face 21 and a distal end or tip 23. Each shank 15 has an inner surface 27 and an outer surface 29. The shanks 15 of the fingers 13 are each bent inwardly relative to the cylindrical side wall 5 such that the outer surface 29 of each shank 15 is offset at an angle B from the outer surface 6 of the side wall 5. The angle B is an acute angle and is preferably in the range of 5 to 30 degrees. An angle B of about 13.5 degrees is believed to be optimal.

Referring again to FIG. 3, the tips 23 of the tabs 17 collectively define a tip circumference, the diameter of which is the distance D3 between the tips 23 of opposed pairs of the tabs 17 along a diameter of the sleeve 1. In a normal or relaxed state of the fingers 13, the tip circumference provides an interference fit between the tips 23 of the tabs 17 and the nipple 3. The interference fit may be an interference between the tip circumference and a minimum circumference of the nipple 3 defined by the minimum diameter of the nipple D1 or the interference fit may only require that the tip circumference be less than a maximum circumference of the nipple 3 defined by the maximum diameter of the nipple D2 at one or more barbs 4. In either instance, the interference fit will inhibit the sleeve 1 from coming off of the nipple 3 once installed thereon.

Referring to FIG. 4, the second end 10 of the sleeve 1 is flared outwardly to simplify insertion of an end of the tubing 2 into the passageway 8.

In use, the end of a length of tubing 2 may be inserted into the sleeve 1 through the second end 10 thereof to form a tubing-sleeve assembly 31 (as shown in FIG. 6) prior to the tubing 2 being pushed onto a nipple 3. Because of the inward angle B of the shanks 15 of the fingers 13, the tubing 2 will come into contact the inner surfaces 27 of the shanks 15 as the tubing 2 is pushed into the sleeve 1 and the tubing 2 will urge the shanks 15 outwardly. As the shanks 15 are urged outwardly, the tabs 17 are also pulled outwardly, thereby increasing the tip circumference. With the tip circumference increased, the tubing-sleeve assembly 31 can be pushed onto the nipple 3 without the tips 23 interfering with the nipple 3 or the barbs 4 thereon. Interference between the tips 23 and the nipple 3 is undesirable during installation of the sleeve 1 on the nipple 3 since such interference could produce scratches or gouges in the nipple 3 or barbs 4 that might promote leakage. Once the tubing-sleeve assembly 31 is fully pressed onto the nipple 3, the sleeve 1 can be crimped to complete the installation using a crimping tool (not shown).

Alternatively, the sleeve 1 may be pre-installed on the nipple 3 to form a sleeve-nipple assembly 33 (as shown in FIG. 7) prior to the tubing 2 being inserted into the sleeve 1. Because of the interference fit between the nipple 3 and the tips 23 of the fingers 13, the sleeve 1 will be retained on the nipple 3 and will not fall off during shipping or installation of the assembly 33. The inward angle of the tabs 17 created by the angle A being somewhat less than 90 degrees also aids in retaining the sleeve 1 on the nipple 3 since the tips 23 tend to dig into the nipple 3 and catch on the barbs 4 in opposition to any withdrawing force.

The installation of the sleeve 1 onto the nipple 3 may be done at a manufacturing facility using a jig or other tool to expand the fingers of the sleeve 1 so that the nipple 3 is not damaged. The tubing 2 can be installed on the assembly 33 by pushing the tubing 2 simultaneously onto the nipple 2 and into the second end 10 of the sleeve 1. Once the tubing 2 is fully pressed onto the nipple-sleeve assembly 33, the sleeve 1 can be crimped to complete the installation using a crimping tool (not shown).

It should be noted that in either of the above methods, an installer will be able to see the tubing 2 through the slots 11 of the sleeve 1 as he or she pushes the tubing 2 into the sleeve 1, and will thereby know whether the tubing 2 is fully inserted into the sleeve 1. When the tubing 2 is being inserted over the nipple 3, the installer can see that the end of the tubing 3 has passed over the barbs 4. The tabs 17 will collectively act as a stop to prevent the tubing 2 from being over-inserted.

Figure 9:
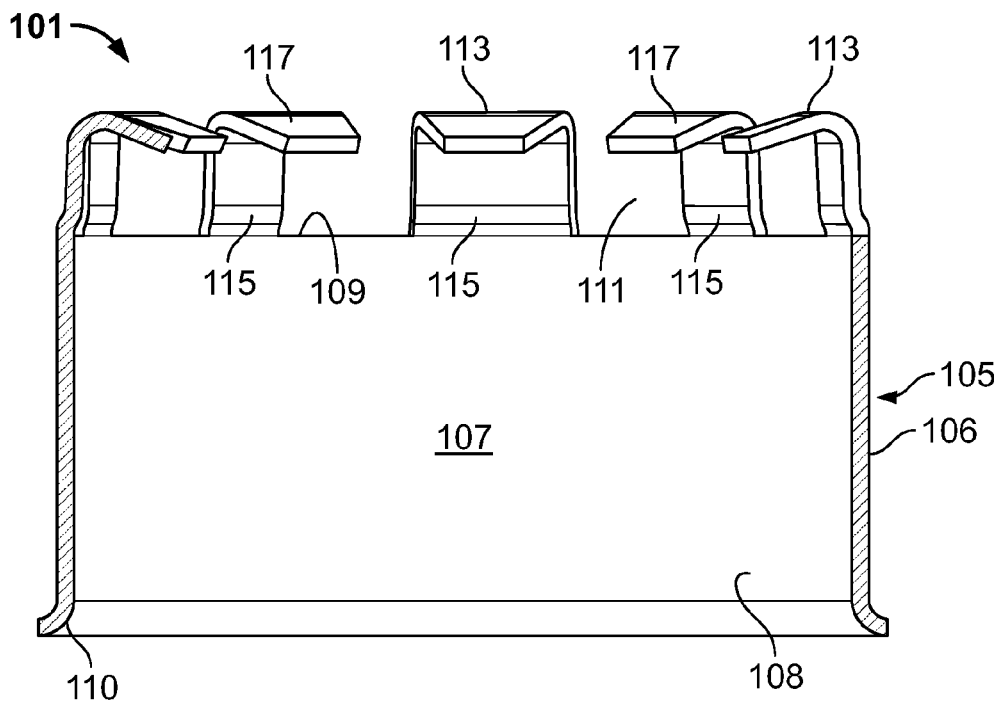
FIG. 9 is a view similar to FIG. 4 showing a first alternative embodiment of the crimp sleeve.
Figure 10:
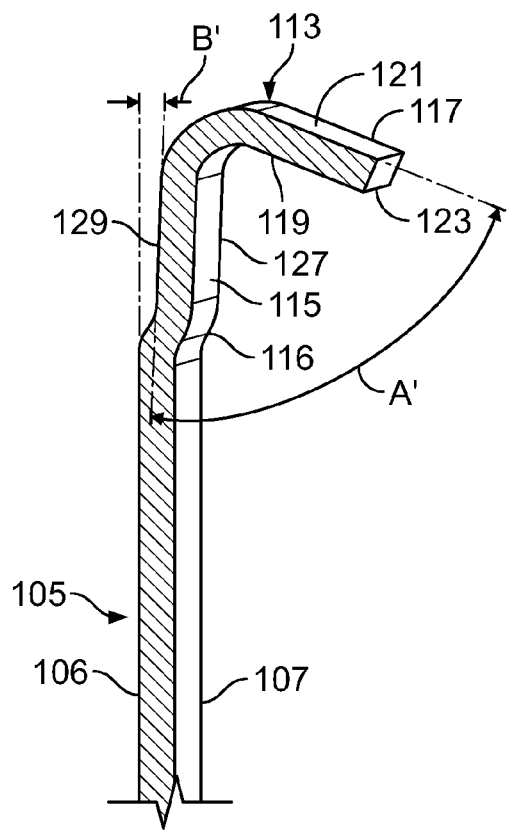
FIG. 10 is a view similar to FIG. 5 showing a single finger of the first alternative embodiment of the crimp sleeve.

An alternative embodiment 101 of the sleeve is shown in FIGS. 9-10. Similar to the sleeve 1, the sleeve 101 is formed of sheet metal and includes a generally cylindrical side wall 105 having an outer surface 106 and an inner surface 107 defining a central passageway 108. The passageway 108 has a diameter sized to receive the tubing 2 and to generally conform to the outside diameter of the tubing 2. The sleeve 101 has first and second ends 109 and 110, respectively. The first end 109 of the sleeve 101 has a plurality of fingers 113 which extend generally longitudinally outwardly therefrom and are offset slightly radially inward. The fingers 113 are circumferentially spaced apart around the perimeter of the side wall 105 by slots 111. Each finger 113 includes a shank 115 and a tab 117 which extends radially inward from the respective shank 115 into the passageway 108. Each tab 117 includes an inner face 119, an outer face 121 and a distal end or tip 123. Each shank 115 has an inner surface 127 and an outer surface 129.

The sleeve 101 differs from the sleeve 1 in that each finger 113 includes a compound bend 116 which causes each shank 115 to be offset inwardly from the cylindrical side wall 105 at its proximate end. The inner surface 127 of each shank 115 is thus spaced inwardly from the inner surface 107 of the cylindrical sidewall 105 along its entire length. The offset of the shanks 115 is selected to cause the fingers 113 to grip a tube 2 inserted into the passageway 108.

The outer surface 129 of each shank 115 is offset radially inwardly from the outer surface 106 of the cylindrical side wall 105 and oriented at an angle B' thereto. The angle B' is preferably in the range of one to seven degrees. It is foreseen, however, that the shanks 115 could each be parallel to the side wall 105. Each tab 117 is positioned at an angle A' relative to the respective shank 115 of approximately seventy degrees.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A crimp sleeve for fastening a length of flexible tubing to a nipple, said crimp sleeve comprising:
   a) a cylindrical wall having a first end, a second end, an outer surface and an inner surface defining a passageway, said passageway sized to receive an end of a length of flexible tubing;
   b) a plurality of fingers extending longitudinally outward from said first end of said cylindrical sidewall, each said finger having a shank and a tab extending radially inwardly from the respective shank into said passageway, each said shank having an inner surface and an outer surface; wherein:
   c) said inner surface of each said shank is offset inwardly from said inner surface of said cylindrical wall.

2. The crimp sleeve as in claim 1 wherein said inner surface of each said shank is inwardly offset at a first angle to said inner surface of said cylindrical wall.

3. The crimp sleeve as in claim 2 wherein said first angle is an acute angle.

4. The crimp sleeve as in claim 3 wherein said first angle is between about 5 and about 30 degrees.

5. The crimp sleeve as in claim 1 wherein each said tab extends inwardly from the respective shank at a second angle which is less than 90 degrees.

6. The crimp sleeve as in claim 5 wherein said second angle is between about 45 and about 89 degrees.

7. The crimp sleeve as in claim 1 in combination with a nipple wherein said tabs of said sleeve each have a tip and said tips collectively define a tip circumference, wherein said tip circumference provides an interference fit with a circumference of said nipple.

8. The combination as in claim 7 wherein said crimp sleeve is pre-installed on said nipple, said interference fit retaining said crimp sleeve on said nipple.

9. The crimp sleeve as in claim 1 in combination with a nipple having at least one barb extending radially outwardly therefrom wherein said tabs of said sleeve each have a tip and said tips collectively define a tip circumference, wherein said tip circumference is less than a maximum circumference of the nipple defined by said at least one barb.

10. The combination as in claim 9 wherein said tip circumference is an interference fit with a minimum circumference of said nipple.

11. The combination as in claim 9 wherein said tip circumference is greater than a minimum circumference of said nipple.

12. The crimp sleeve as in claim 1 in combination with a length of flexible tubing wherein said tabs of said sleeve each have a tip and said tips collectively define a tip circumference, wherein when said length of tubing is inserted into said passageway said tubing contacts said inner surfaces of said shanks and urges said fingers outwardly, thereby increasing said tip circumference.

13. The crimp sleeve as in claim 1 wherein said inner surface of each said shank is spaced inwardly from said inner surface of said cylindrical sidewall along its entire length.

14. A sleeve-nipple assembly comprising:
   a) a nipple having a nipple circumference; and
   b) a crimp sleeve receiving said nipple, said crimp sleeve comprising:
      i) a cylindrical wall having a first end, a second end, an outer surface and an inner surface defining a passageway;
      ii) a plurality of fingers extending longitudinally outward from said first end of said cylindrical sidewall, each said finger having a shank and a tab extending radially inwardly from the respective shank into said passageway, each said shank having an inner surface and an outer surface; wherein:
      iii) said inner surface of each said shank is offset inwardly from said inner surface of said cylindrical wall and;
      iv) said tabs of said sleeve each have a tip and said tips collectively define a tip circumference, wherein said tip circumference provides an interference fit with said nipple circumference.

15. The sleeve-nipple assembly as in claim 14 wherein said interference fit is between said tip circumference and a minimum circumference of said nipple.

16. The sleeve-nipple assembly as in claim 14 wherein said nipple includes a minimum circumference and at least one barb extending radially outwardly past said minimum circumference and wherein said tip circumference is greater than said minimum circumference of said nipple and said interference fit is between said tip circumference and a maximum circumference defined by said at least one barb.

17. The sleeve-nipple assembly as in claim 14 wherein said inner surface of each said shank is spaced inwardly from said inner surface of said cylindrical sidewall along its entire length.

18. A tubing-sleeve assembly comprising:
   a) a crimp sleeve comprising:
      i) a cylindrical wall having a first end, a second end, an outer surface and an inner surface defining a passageway;
      ii) a plurality of fingers extending longitudinally outward from said first end of said cylindrical sidewall, each said finger having a shank and a tab extending radially inwardly from the respective shank into said passageway, each said shank having an inner surface and an outer surface; wherein:

iii) said inner surface of each said shank is offset inwardly at a first angle from said inner surface of said cylindrical wall and;

iv) said tabs of said sleeve each have a tip and said tips collectively define a tip circumference; and b) a length of flexible tubing having an end received within said passageway of said crimp sleeve, said tubing contacting said inner surfaces of said shanks of said fingers and urging said fingers outwardly, thereby increasing said tip circumference.

19. The tubing-sleeve assembly as in claim 18 wherein said first angle is an acute angle.

20. The tubing-sleeve assembly as in claim 19 wherein said first angle is between about 5 and about 30 degrees.

21. The tubing-sleeve assembly as in claim 18 wherein said inner surface of each said shank is spaced inwardly from said inner surface of said cylindrical sidewall along its entire length.

* * * * *